United States Patent
Masters

(10) Patent No.: US 9,435,875 B2
(45) Date of Patent: Sep. 6, 2016

(54) HOT DESK SETUP USING GEOLOCATION

(75) Inventor: Jon Masters, Cambridge, MA (US)

(73) Assignee: Red Hat, Inc., Raleigh, NC (US)

( * ) Notice: Subject to any disclaimer, the term of this patent is extended or adjusted under 35 U.S.C. 154(b) by 361 days.

(21) Appl. No.: 13/590,010

(22) Filed: Aug. 20, 2012

(65) Prior Publication Data

US 2014/0052974 A1  Feb. 20, 2014

(51) Int. Cl.
G06F 9/00 (2006.01)
G06F 9/24 (2006.01)
G01S 5/02 (2010.01)
G06F 9/44 (2006.01)
G01S 5/00 (2006.01)

(52) U.S. Cl.
CPC ............... G01S 5/02 (2013.01); G01S 5/0027 (2013.01); G06F 9/4401 (2013.01); G06F 9/4406 (2013.01)

(58) Field of Classification Search
CPC .... G06F 9/44; G06F 9/4401; G06F 21/6218; G06F 17/30557; G06F 9/543
USPC ......................................................... 713/1, 2
See application file for complete search history.

(56) References Cited

U.S. PATENT DOCUMENTS

| | | | |
|---|---|---|---|
| 7,506,366 B1 * | 3/2009 | Sze et al. ........................... | 726/5 |
| 2005/0193144 A1 * | 9/2005 | Hassan .................... | G06F 21/31 |
| | | | 709/238 |
| 2007/0237096 A1 * | 10/2007 | Vengroff et al. .............. | 370/254 |
| 2007/0240002 A1 * | 10/2007 | Motoyama .................... | 713/320 |
| 2008/0270814 A1 * | 10/2008 | Starr et al. ..................... | 713/323 |
| 2009/0036148 A1 * | 2/2009 | Yach ............................. | 455/457 |
| 2009/0147937 A1 | 6/2009 | Sullhan et al. | |
| 2010/0077241 A1 * | 3/2010 | Piazza et al. ................. | 713/320 |
| 2010/0267374 A1 | 10/2010 | Armstrong et al. | |
| 2011/0138024 A1 * | 6/2011 | Chen et al. ................... | 709/220 |
| 2011/0231020 A1 * | 9/2011 | Ramachandran .. | G05D 23/1905 |
| | | | 700/278 |
| 2012/0158203 A1 * | 6/2012 | Feldstein ...................... | 700/295 |
| 2012/0284322 A1 * | 11/2012 | Laborczfalvi et al. ....... | 709/202 |
| 2013/0019089 A1 * | 1/2013 | Guidotti et al. ............. | 713/100 |
| 2013/0346310 A1 * | 12/2013 | Burger et al. .................. | 705/44 |

* cited by examiner

Primary Examiner — Phil Nguyen
(74) Attorney, Agent, or Firm — Lowenstein Sandler LLP

(57) ABSTRACT

A geolocation system determines a location of a user mobile device. The geolocation system identifies a hot desk policy associated with the location of the user mobile device and automatically configures a workspace according to the hot desk policy associated with the location of the user mobile device.

15 Claims, 5 Drawing Sheets

HOT DESK SETUP USING GEOLOCATION

TECHNICAL FIELD

This disclosure relates to the field of geolocation and, in particular, to hot desk setup using geolocation.

BACKGROUND

In the modern business climate, many businesses and organizations have multiple office locations. These offices may be spread throughout the country and even across the world. In many cases, these businesses may store important files and other data in a centralized file system. Employees or other users may also store important or frequently used files locally at their "home office" or the location where they work most often. If the need to travel to another office location anises, the employee may access the files over a network if the office where they are located is not at the same location where the file system resides.

Each employee or user may have a profile associated with them, that they can load when using a computer at a different office location. The profile may include information on user preferences, desktop files, configuration settings, frequently used files, etc., that makes the computer at the remote office location seem and feel like the computer in their home office. One drawback is that loading this user profile can be a time consuming process. The user should contact someone at the remote office location to inform them that he or she will be arriving and ask them to load the user profile. The user profile may need to be downloaded over a network (e.g., from the centralized file system), which can take time depending on the size of the profile information. If the user has to make an unexpected trip to a different office, the profile may not be able to be preloaded, causing the user to have to wait, losing valuable time and decreasing productivity.

BRIEF DESCRIPTION OF THE DRAWINGS

The present disclosure is illustrated by way of example, and not by way of limitation, in the figures of the accompanying drawings.

DETAILED DESCRIPTION

Figure 1:
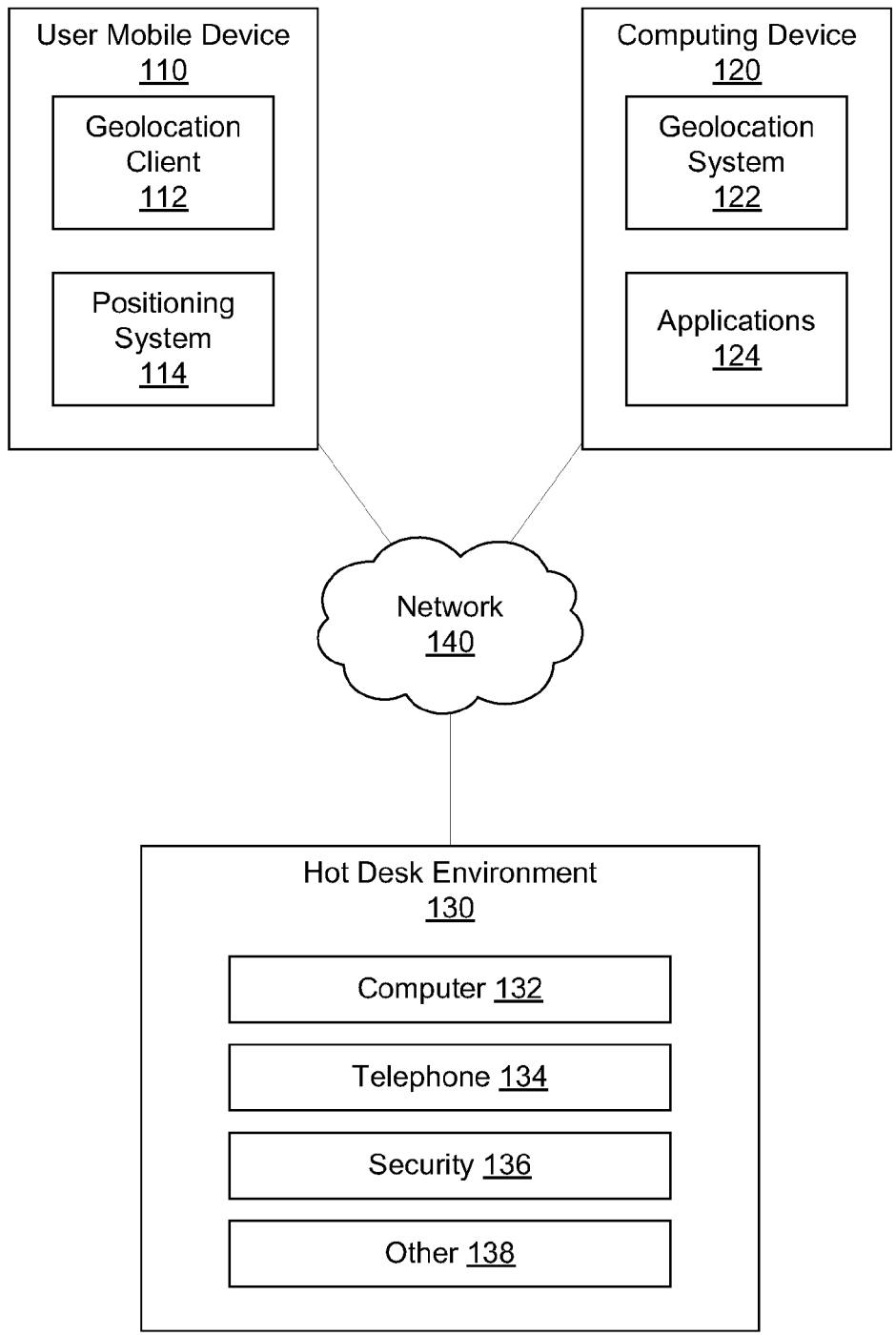
FIG. 1 is a block diagram illustrating a computing environment for hot desk setup using geolocation, according to an embodiment.

The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

Embodiments are described for setting up a hot desk based on geolocation. In one embodiment, a geolocation system determines a location of a user mobile device. The geolocation system may receive coordinates of the user mobile device and determine a street address of the user mobile device based on the coordinates. The geolocation system may resolve a location of the user mobile device based on the street address. The geolocation system may identifying a hot desk policy associated with the location of the user mobile device by looking up the location of the user mobile device in a hot desk policy database. In response to identifying the policy, the geolocation system may automatically configure a workspace according to the hot desk policy associated with the location of the user mobile device. Configuring the workspace according to the hot desk policy may include, for example, loading a user profile, including user preferences, desktop files, configuration settings, and frequently used files, onto a computer in the workspace, and routing incoming telephone phone calls to a telephone in the workspace.

In one embodiment, the geolocation system may additionally identify a security policy associated with the location of the user mobile device. In response to identifying the security policy, the geolocation system may configure a security system to grant access to a user of the user mobile device according to the security policy associated with the location of the user mobile device. Configuring the security system according to the security policy may include, for example, granting the user access to a building and floor where the workspace is located. In addition, the geolocation system may verify the location of the user mobile device with data from an application (e.g., a calendar or email) associated with the user.

Using geolocation to setup a hot desk for a user allows them to use a workspace at a remote office location that seems and feels like the workspace in their home office. Automatically configuring the workspace according to the policy prevents the user from having to contact someone at the remote office location to inform them that he or she will be arriving and ask them to load the appropriate user profile. The user also does not have to wait for their profile to be downloaded over a network, losing valuable time and decreasing productivity.

FIG. 1 is a block diagram illustrating a computing environment for hot desk setup using geolocation, according to an embodiment of the present invention. In one embodiment, network environment 100 includes user mobile device 110, computing device 120, and hot desk environment 130. User mobile device 110, computing device 120 and hot desk environment 130 may be connected through a series of one or more networks 140, which may be, for example, a local area network (LAN), a wide area network (WAN), a global area network (GAN) such as the Internet, or a combination of such networks. In another embodiment, user mobile device 110, computing device 120 and hot desk environment 130 may have a direct connection to each of the other devices in the network. The illustrated embodiment shows one user mobile device 110, computing device 120 and hot desk environment 130, however, in other embodiments, there may be any number of user mobile devices, computing devices and hot desk environments, and environment 100 may include additional and/or different devices.

User mobile device 110 may be, for example, a personal computer (PC), workstation, laptop computer, tablet computer, mobile phone, personal digital assistant (PDA) or the like. In one embodiment, user mobile device 110 includes geolocation client 112 and positioning system 114. Geolocation client 112 may be an application or program designed to obtain location information from positioning system 114 and relay the location information to a geolocation system 122 on computing device 120 (e.g., over network 140). Positioning system 114 may include a receiver to communicate with a navigation system, such as the Global Positioning System (GPS), to determine a location of the user mobile device 110. In other embodiments, positioning system 114 may determine the location of user mobile device 110 based on an Internet Protocol (IP) address, a Message Authentication Code (MAC) address, radio-frequency identification (RFID), Wi-Fi connection location, or by some other means. Positioning system 114 may determine the location of user mobile device 110 using a set of universal coordinates, such as latitude and longitude. In one embodiment, user mobile device 110 may be a device that the user has with them most of the time (e.g., a smartphone), such that the location of user mobile device 110 can usually be associated with the location of the user.

Computing device 120 may be any computing device, such as computing system 500, described below with respect to FIG. 5. In one embodiment, computing device 120 may be a server, or other computer, operated by the user or by an organization with which the user is associated (e.g., the user's employer). In one embodiment, computing device 120 includes geolocation system 122 and one or more computer application programs (applications) 124. Geolocation system 122 may determine a geolocation based on the location information provided by geolocation client 112. Geolocation may include the identification of a real-world geographic location of an object, such as user mobile device 110 (e.g., a smartphone) or a person using that device. Geolocation is closely related to positioning but can be distinguished by a greater emphasis on determining a meaningful location (e.g. a street address) rather than just a set of geographic coordinates (e.g., latitude and longitude). Internet and computer geolocation can be performed by associating a geographic location with the Internet Protocol (IP) address, Wi-Fi connection location, Global Positioning System (GPS) coordinates, or other, perhaps self-disclosed information of the user mobile device 110. Geolocation works by automatically looking up the GPS coordinates in an address lookup service and retrieving the registrant's physical address. The address geolocation data can include information such as country, region, city, postal/zip code, latitude, longitude and timezone.

Applications 124 may perform one or more computer implemented functions. Applications 124 may implement the functionality of word processing programs, spreadsheet programs, email programs, calendar programs, chat programs, web browsers or other programs. Geolocation system 120 may pull information from applications 124 to aid in the determination of the geolocation or confirm that the location is correct. For example, a calendar program or an email may indicate that the user was scheduled to be at a certain location on a certain day and time. Geolocation system 120 may scan the calendar or email to obtain this information and compare that information to the location information obtained from geolocation client 112. This may lead to a more accurate detemination of the location of user mobile device 110.

Hot desk environment 130 may be desk or workspace that an individual may use, most likely on a temporary basis. Hot desk environment may be physically located in a remote office location, where the user does not normally sit or work. In one embodiment, hot desk environment includes a computer 132, telephone 134, security system 136 and/or other devices 138 (e.g., an information display screen, parking information, etc.). Based on the location of user mobile device 110, geolocation system 122 in computing device 120 can automatically setup or configure hot desk environment 130 for use by the user. For example, geolocation system 122 can load a user profile, including user preferences, desktop files, configuration settings, frequently used files, etc., onto computer 132, route incoming phone calls to telephone 134, and/or grant the user access to appropriate buildings or floors via security system 136. Additional details of setting up hot desk environment 130 using geolocation in accordance with some embodiments will be provided below.

Figure 2:
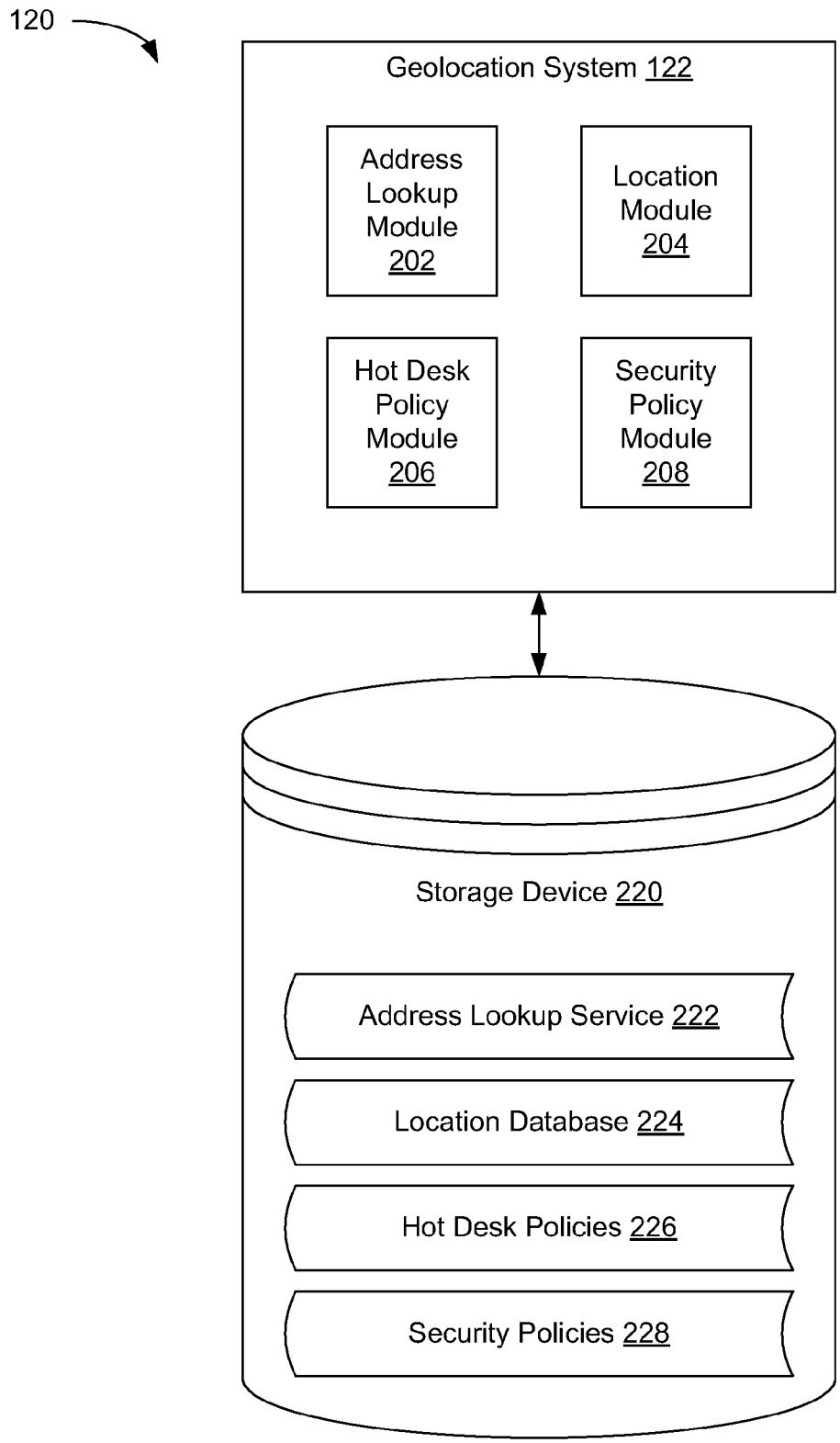
FIG. 2 is a block diagram illustrating a geolocation system for hot desk setup, according to an embodiment.

FIG. 2 is a block diagram illustrating a geolocation system for hot desk setup, according to an embodiment of the present invention. In one embodiment, geolocation system 122 runs on computing device 120, as shown in FIG. 1. In one embodiment, geolocation system 122 includes address lookup module 202, location module 204, hot desk policy module 206 and security policy module 208. Geolocation system 122 may be coupled to a storage device 220 which includes address lookup service 222, location database 224, hot desk policies 226 and security policies 228. Storage device 220 may be part of computing device 120 or may be part of another device in network environment 100 and may be, for example, memory, such as read-only memory (ROM), flash memory, random access memory (RAM), etc., or a mass storage device, such as a magnetic or optical storage device.

In one embodiment, address lookup module 202 receives location information from geolocation client 112 on user mobile device 110. The location information may include coordinates, such as latitude and longitude. Address lookup module 202 may consult address lookup service 222 to resolve the coordinates to physical street address. Address lookup service 222 may be a lookup table, database, or other data structure containing information relating coordinates and addresses. In another embodiment, address lookup module 202 may resolve the coordinates using an address lookup service 222 located on some other device (e.g., accessible via network 140).

In one embodiment, location module 204 may determine an actual location based on the street address determined by address lookup module 202. For example, location module 204 may consult location database 224. Location database 224 may be a database, table, or other data structure including information relating street addresses and actual locations. In one embodiment, location database 224 may contain a private or personal section, as well as a public or shared section. In the private section, a user may create entries for places that are only of interest to themselves (e.g., "Home," "Work," "Mom and Dad's," etc.). In the public section, multiple users may contribute entries for places that are of interest to everyone (e.g., "Library," "Coffee Shop," "Grocery Store," etc.). Each entry in location database 224 may include the street address of a location, as well as a name or title of that location. In another embodiment, location module 204 may determine the location of an address using some other means (e.g., the Internet or a database located on some other device).

Hot desk policy module 206 may configure hot desk environment 130 according to the location of user mobile device 110 determined by location module 204 and based on hot desk policies 226. Hot desk policies 226 may include a set of one or more policies defined by a user, system administrator or some other person for setting up hot desk environment 130. For example, hot desk policies 226 may dictate that if a user is at a location designated as a remote office, hot desk policy module 206 should configure computer 132 with the user profile information for that user and route incoming phone calls from the users regular desk phone to telephone 134 in hot desk environment 130. In one embodiment, hot desk policy module 206 may confirm that a user is supposed to be at the remote office location by checking the user's calendar or emails in applications 124. For example, hot desk policies 226 may dictate that hot desk policy module 206 only configure hot desk environment 130 if the user's calendar indicates that they are supposed to be at the remote office and the location module 204 indicates that the user is actually at the office or traveling in the direction of the office. There may be any number of additional and or different policies, configurations or options stored as part of hot desk policies 226.

Security policy module 228 may configure the security system 136 of hot desk environment 130 according to the location of user mobile device 110 determined by location module 204 and based on security policies 228. Security policies 228 may include a set of one or more policies defined by a user, system administrator or some other person for security within hot desk environment 130. For example, security policies 228 may dictate that if a user is at a location designated as a remote office, security policy module 208 should configure security system 136 to allow the user access (e.g., using a badge or identification card) to the building or floors where the remote office is located. In one embodiment, security policy module 208 may confirm that a user is supposed to be at the remote office location by checking the user's calendar or emails in applications 124. For example, security policies 228 may dictate that security policy module 208 only allow the user access by security system 136 if the user's calendar indicates that they are supposed to be at the remote office and the location module 204 indicates that the user is actually at the office. There may be any number of additional and or different policies, configurations or options stored as part of security policies 228.

In one embodiment, hot desk policies 226 and/or security policies 228 may include configuration options for other devices 138 in hot desk environment 130. For example, in addition to granting access to a building where the workspace is located, the policies can cause a welcome message to be displayed on a display screen in the lobby of the building. Upon determining that the user mobile device 110 was located in (or approaching) the lobby, geolocation system 122 may display a message indicating where the user's workstation is located (e.g., floor number, office number, cubicle number, etc.). Upon the user mobile device 110 leaving the lobby, this message may be removed from the display screen. In another embodiment, geolocation system 122 may additionally pre-fill visitor information for the user at a sign-in kiosk in the lobby. In another embodiment, a similar display screen or indicator may be located, for example, in a parking lot or parking garage. Upon determining that the user mobile device 110 was located in (or approaching) the parking garage, geolocation system 122 may display a message indicating where the user should park his or her car (e.g., floor number, space number, etc.) In addition, the display screen may provide directions to the parking space. Upon the user mobile device 110 reaching the designated parking space, this message may be removed from the display screen.

Figure 3:
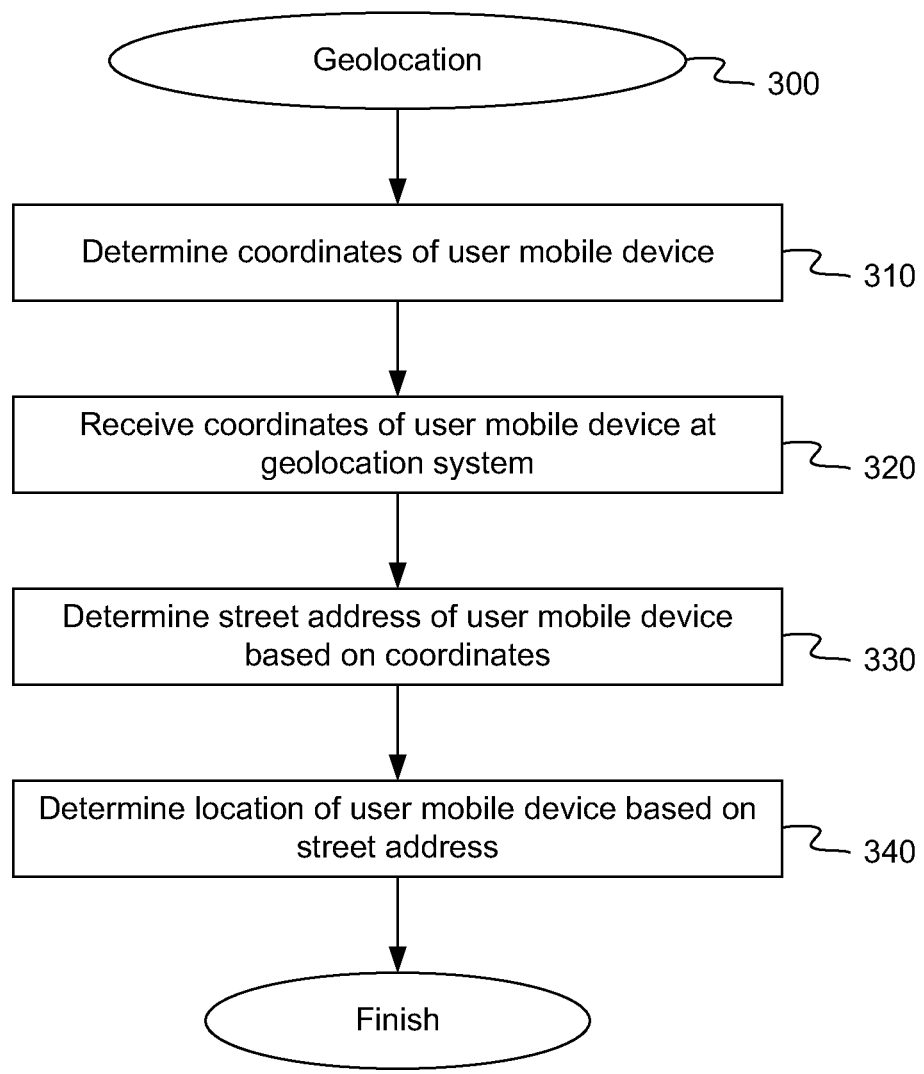
FIG. 3 is a flow diagram illustrating a geolocation method for setting up a hot desk, according to an embodiment.

FIG. 3 is a flow diagram illustrating a geolocation method for setting up a hot desk, according to an embodiment of the present invention. The method 300 may be performed by processing logic that comprises hardware (e.g., circuitry, dedicated logic, programmable logic, microcode, etc.), software (e.g., instructions run on a processing device to perform hardware simulation), or a combination thereof. The processing logic is configured to determine the real-world geographic location of a user based on a position of an associated mobile user device. In one embodiment, method 300 may be performed by geolocation client 112 and geolocation system 122, as shown in FIGS. 1 and 2.

Referring to FIG. 3, at block 310, method 300 determines coordinates of user mobile device 110. In one embodiment, positioning system 114 may include a receiver to communicate with a navigation system, such as the Global Positioning System (GPS), to determine coordinates of the user mobile device 110. In other embodiments, positioning system 114 may determine the location of user mobile device 110 based on an Internet Protocol (IP) address, a Message Authentication Code (MAC) address, radio-frequency identification (RFID), Wi-Fi connection location, or by some other means. Positioning system 114 may determine the location of user mobile device 110 using a set of universal coordinates, such as for example, latitude and longitude. Geolocation client 112 on user mobile device 110 may relay these coordinates to computing device 120.

At block 320, method 300 receives the coordinates of the user mobile device 110. A geolocation system 122, running on computing device 120, may request the coordinates, for example, periodically after a preset period of time, or in response to an event, such as a calendar entry indicating a meeting at a specific time or a request by a user or administrator. Geolocation system 122 may receive the coordinates from geolocation client 112.

At block 330, method 300 determines a street address of the user mobile device 110 based on the received coordinates. In one embodiment, address lookup module 202 of geolocation system 122 consults address lookup service 222 to resolve the coordinates to physical street address. Address lookup service 222 may be a lookup table, database, or other data structure containing information relating coordinates and addresses. In another embodiment, address lookup module 202 may resolve the coordinates using an address lookup service 222 located on some other device, such as one accessible via network 140.

At block 340, method 300 determines a location of the user mobile device 110 based on the determined street address. In one embodiment, location module 204 of geolocation system 122 consults location database 224 to determine a location associated with the determined street address. Location database 224 may be a database, table, or other data structure including information relating street addresses and actual locations. In one embodiment, location database 224 may contain a private or personal section, as well as a public or shared section. In the private section, a user may create entries for places that are only of interest to themselves (e.g., "Home," "Work," "Mom and Dad's," etc.) In the public section, multiple users may contribute entries for places that are of interest to everyone (e.g., "Library," "Coffee Shop," "Grocery Store," etc.). Each entry in location database 224 may include the street address of a location, as well as a name or title of that location. In another embodiment, location module 204 may determine the location of an address using some other means, such as the Internet or a database located on some other device. Location module 204 may store the determined location, for example, in storage device 220, for later use in setting up a hot desk, as will be described further below.

Figure 4:
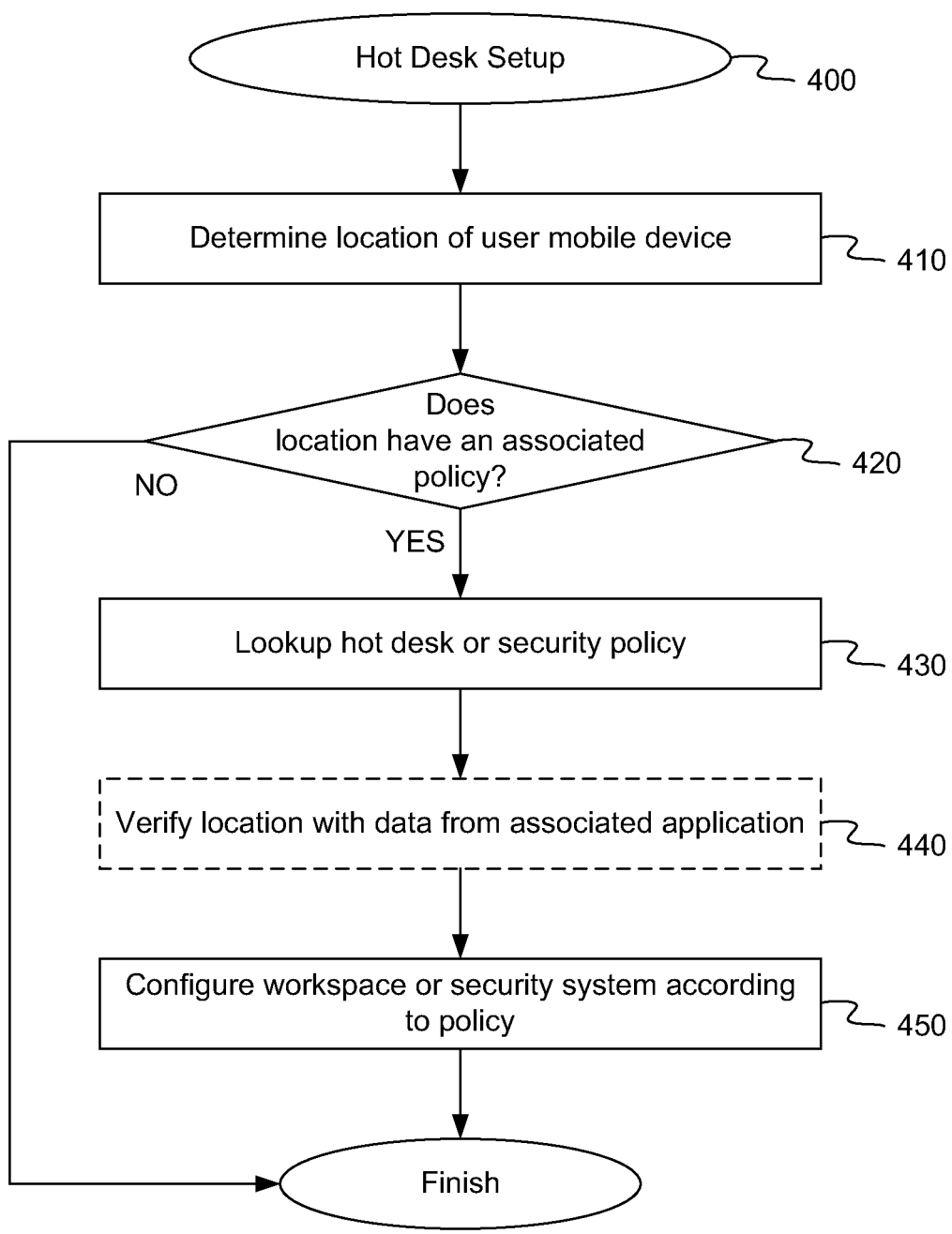
FIG. 4 is a flow diagram illustrating hot desk setup method using geolocation, according to an embodiment.

FIG. 4 is a flow diagram illustrating hot desk setup method using geolocation, according to an embodiment of the present invention. The method 400 may be performed by processing logic that is configured to automatically setup and configure a hot desk for a user based on the location of the user's mobile device. In one embodiment, method 400 may be performed by geolocation system 120, as shown in FIGS. 1 and 2.

Referring to FIG. 4, at block 410, method 400 determines a location of a user mobile device 110. In one embodiment, geolocation system 122 follows method 300, as described above, to determine the coordinates, street address and ultimately, the location of user mobile device 110. In other embodiments, geolocation system 122 determines the location of user mobile device 110 in some other fashion.

At block 420, method 400 determines if the location of the user mobile device 110 determined at block 410 has an associated policy 420. Geolocation system 122 may compare the determined location to the locations represented in hot desk policies 226 and security policies 228. If either hot desk policies 226 or security policies 228 include a policy associated with the location, at block 430, method 400 retrieves the associated policy. For example, if the associated policy is one of hot desk policies 226, hot desk policy module 206 may look up the policy associated with the location. Similarly, if the associated policy is one of security policies 228, security policy module 208 may look up the policy. In some embodiments, there may be an associated policy in both hot desk policies 226 and security policies 228. In that case, both policies may be retrieved.

At block 440, method 400 may optionally verify the determined location of user mobile device 110 with data from an associated application 124. For example, security policy module 208 may confirm that a user is supposed to be at a specific location by checking the user's calendar or emails in applications 124. In one embodiment, security policies 228 may dictate that security policy module 208 only allow the user access to an office building through security system 136 if the user's calendar indicates that they are supposed to be at the remote office and the location of user mobile device 110 from location module 204 indicates that the user is actually at the office.

At block 450, method 400 configures a workspace, such as hot desk environment 130, including security system 136, according to hot desk policies 226 and security policies 228. In one embodiment, based on the location of user mobile device 110, hot desk policy module can automatically setup or configure hot desk environment 130 for use by the user. For example, hot desk policy module 206 can load a user profile, including user preferences, desktop files, configuration settings, frequently used files, virtual local arean network (VLAN) settings, WiFi settings, etc., onto computer 132 or route incoming phone calls to telephone 134. In addition, security policy module 208 can grant the user access to appropriate buildings or floors via security system 136.

Figure 5:
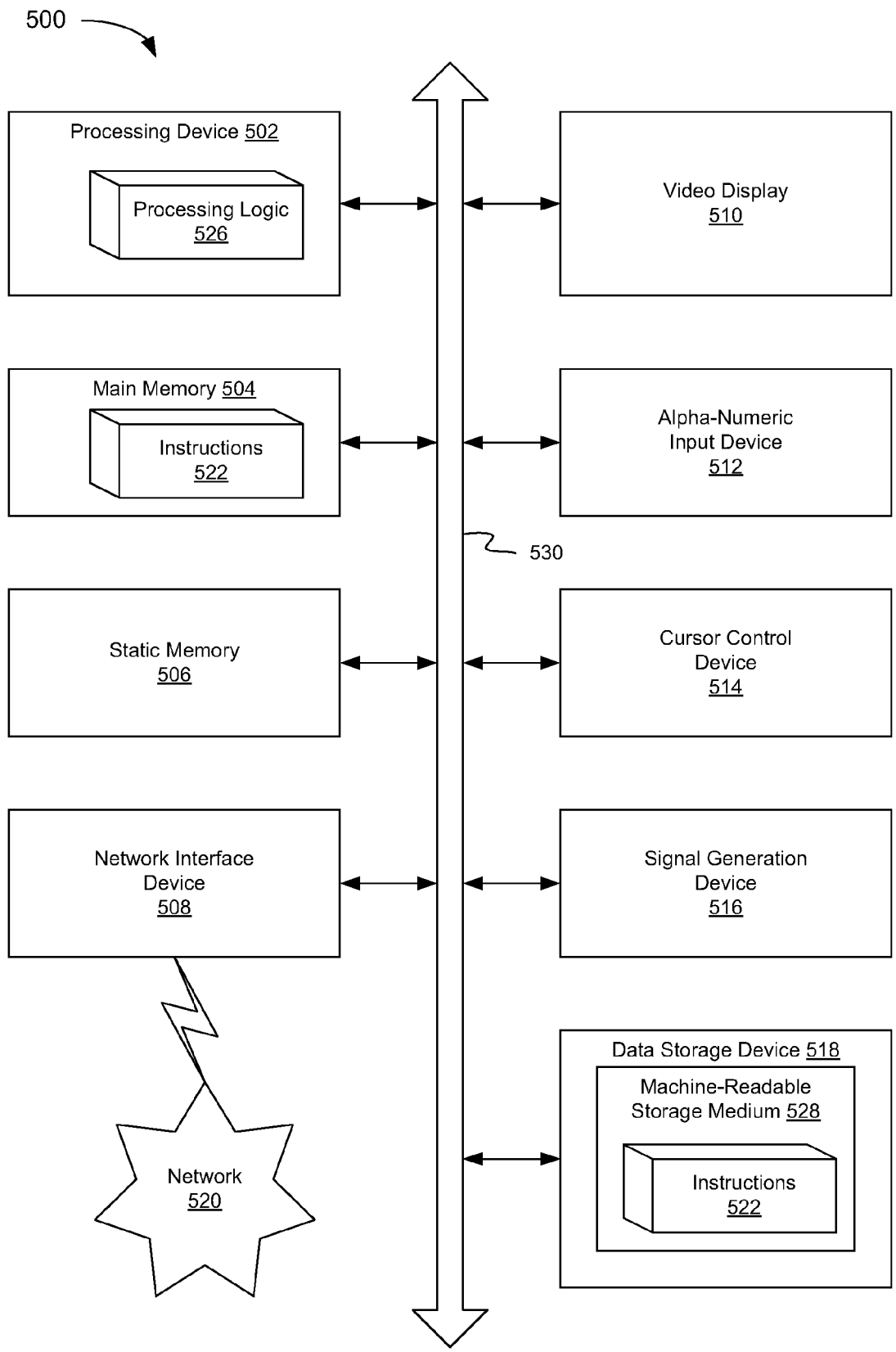
FIG. 5 is a block diagram illustrating one embodiment of a computer system, according to an embodiment.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 500 may be representative of a computing device, such as computing device 120, running geolocation system 122.

The exemplary computer system 500 includes a processing device 502, a main memory 504 (e.g., read-only memory (ROM), flash memory, dynamic random access memory (DRAM) (such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 530. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute processing logic 526 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a machine-accessible storage medium 528, on which is stored one or more set of instructions 522 (e.g., software) embodying any one or more of the methodologies of functions described herein. The instructions 522 may also reside, completely or at least partially, within the main memory 504 and/or within the processing device 502 during execution thereof by the computer system 500; the main memory 504 and the processing device 502 also constituting machine-accessible storage media. The instructions 522 may further be transmitted or received over a network 520 via the network interface device 508.

The machine-readable storage medium 528 may also be used to store instructions to automatically setup a hot desk using geolocation, as described herein. While the machine-readable storage medium 528 is shown in an exemplary embodiment to be a single medium, the term "machine-readable storage medium" should be taken to include a single medium or multiple media (e.g., a centralized or distributed database, and/or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

What is claimed is:

1. A method, comprising:
    determining a location of a user mobile device;
    comparing the location of the user mobile device to a workspace location represented in a hot desk policy;
    in response to the location of the user mobile device matching the workspace location, identifying, by a processing device, the hot desk policy associated with the workspace location;
    identifying a security policy associated with the location of the user mobile device;
    verifying the location of the user mobile device with data from an application associated with a user by determining that the application indicates an expected location of the user that matches the location of the user mobile device;
    configuring a workspace at the workspace location according to the hot desk policy associated with the workspace location, wherein the workspace is separate from the user mobile device; and
    configuring a security system at the workspace location to grant access to the user of the user mobile device according to the security policy.

2. The method of claim 1, wherein determining the location of the user mobile device comprises:
    receiving coordinates of the user mobile device;
    determining a street address of the user mobile device in view of the coordinates; and
    resolving the location of the user mobile device in view of the street address.

3. The method of claim 1, wherein identifying the hot desk policy comprises looking up the location of the user mobile device in a hot desk policy database.

4. The method of claim 1, wherein configuring the workspace according to the hot desk policy comprises:
    loading a user profile, including user preferences, desktop files, configuration settings, and frequently used files, onto a computer in the workspace; and
    routing incoming telephone phone calls to a telephone in the workspace.

5. The method of claim 1, wherein configuring the security system according to the security policy comprises granting the user access to a building and floor where the workspace is located.

6. A system comprising:
    a memory; and
    a processing device operatively coupled to the memory, the processing device to:
    determine a location of a user mobile device;
    compare the location of the user mobile device to a workspace location represented in a hot desk policy;
    in response to the location of the user mobile device matching the workspace location, identify a hot desk policy associated with the workspace location;
    identify a security policy associated with the workspace location of the user mobile device;
    verify the location of the user mobile device with data from an application associated with a user, wherein to verify the location of the user mobile device, the processing device to determine that the application indicates an expected location of the user that matches the location of the user mobile device;
    configure a workspace at the workspace location according to the hot desk policy associated with the workspace location, wherein the workspace is separate from the user mobile device; and
    configure a security system at the workspace location to grant access to the user of the user mobile device according to the security policy.

7. The system of claim 6, wherein when the processing device determines the location of the user mobile device, the processing device to:
    receive coordinates of the user mobile device;
    determine a street address of the user mobile device in view of the coordinates; and
    resolve the location of the user mobile device in view of the street address.

8. The system of claim 6, wherein when the processing device is to identify the hot desk policy, the processing device to look up the location of the user mobile device in a hot desk policy database.

9. The system of claim 6, wherein when the processing device configures the workspace according to the hot desk policy, the processing device to:
    load, onto a computer in the workspace, a user profile comprising at least one of user preferences, desktop files, configuration settings, or frequently used files; and
    route incoming telephone phone calls to a telephone in the workspace.

10. The system of claim 6, wherein when the processing device configures the security system according to the security policy, the processing device to grant the user access to a building and floor where the workspace is located.

11. A non-transitory machine-readable storage medium storing instructions which, when executed, cause a processing device to:
    determine a location of a user mobile device;
    compare the location of the user mobile device to a workspace location represented in a hot desk policy;

in response to the location of the user mobile device matching the workspace location, identify, by the processing device, a hot desk policy associated with the workspace location;

identify a security policy associated with the workspace location of the user mobile device;

verify the location of the user mobile device with data from an application associated with the user, wherein to verify the location of the user mobile device, the processing device to determine that the application indicates an expected location of a user that matches the location of the user mobile device;

configure a workspace at the workspace location according to the hot desk policy associated with the workspace location, wherein the workspace is separate from the user mobile device; and configure a security system at the workspace location to grant access to the user of the user mobile device according to the security policy.

12. The non-transitory machine-readable storage medium of claim 11, wherein to determine the location of the user mobile device, the processing device further to:

receive coordinates of the user mobile device;

determine a street address of the user mobile device in view of the coordinates; and resolve the location of the user mobile device in view of the street address.

13. The non-transitory machine-readable storage medium of claim 11, wherein to identify the hot desk policy, the processing device to perform further to look up the location of the user mobile device in a hot desk policy database.

14. The non-transitory machine-readable storage medium of claim 11, wherein to configure the workspace according to the hot desk policy, the processing device further to:

load, onto a computer in the workspace, a user profile comprising at least one of user preferences, desktop files, configuration settings, or frequently used files; and route incoming telephone phone calls to a telephone in the workspace.

15. The non-transitory machine-readable storage medium of claim 11, wherein to configure the security system according to the security policy, the processing device further to grant the user access to a building and floor where the workspace is located.

* * * * *